(12) United States Patent
Frakes

(10) Patent No.: US 9,503,560 B1
(45) Date of Patent: Nov. 22, 2016

(54) REMOTE CONTROL FOR MOBILE APPLICATIONS

(71) Applicant: Michael Frakes, Minnoka, IL (US)

(72) Inventor: Michael Frakes, Minnoka, IL (US)

( * ) Notice: Subject to any disclaimer, the term of this patent is extended or adjusted under 35 U.S.C. 154(b) by 0 days.

(21) Appl. No.: 14/969,704

(22) Filed: Dec. 15, 2015

(51) Int. Cl.
*H04M 3/00* (2006.01)
*H04M 1/725* (2006.01)
*H04W 4/00* (2009.01)
*H04M 1/02* (2006.01)

(52) U.S. Cl.
CPC ......... *H04M 1/7253* (2013.01); *H04M 1/0256* (2013.01); *H04W 4/001* (2013.01); *H04W 4/008* (2013.01)

(58) Field of Classification Search
CPC H04B 10/564; H04B 10/541; H04B 10/272; H04Q 11/0066; H04Q 11/0003; H04Q 2011/0083; H04L 43/16
USPC .................................................. 455/419–420
See application file for complete search history.

(56) References Cited

U.S. PATENT DOCUMENTS

| | | | |
|---|---|---|---|
| 6,346,934 B1 | 2/2002 | Wugofski | |
| 6,477,117 B1 * | 11/2002 | Narayanaswami | .. G04G 13/026 368/224 |
| 6,556,222 B1 * | 4/2003 | Narayanaswami | .. G04G 9/0064 368/295 |
| D551,632 S | 9/2007 | Kim | |
| 2004/0027495 A1 | 2/2004 | Ferris | |
| 2009/0091532 A1 | 4/2009 | Hockett | |
| 2012/0178431 A1 * | 7/2012 | Gold | .................... H04M 1/7253 455/420 |
| 2012/0295662 A1 | 11/2012 | Haubrich | |
| 2013/0165180 A1 * | 6/2013 | Fukuda Kelley | ...... G05B 19/02 455/556.1 |
| 2014/0259061 A1 | 9/2014 | Delpuch | |
| 2014/0334271 A1 * | 11/2014 | Park | ........................ G04G 21/04 368/10 |
| 2015/0253885 A1 * | 9/2015 | Kagan | .................... G06F 3/0482 368/10 |
| 2015/0326704 A1 * | 11/2015 | Ko | ........................ H04M 1/7253 455/456.3 |
| 2015/0332031 A1 * | 11/2015 | Mistry | .................... G06F 21/316 726/19 |
| 2016/0057268 A1 * | 2/2016 | Jiang | ......................... H04B 5/00 455/556.1 |
| 2016/0062319 A1 * | 3/2016 | Kim | ......................... G04C 10/00 368/204 |
| 2016/0134737 A1 * | 5/2016 | Pulletikurty | .......... G06F 3/0227 715/735 |

FOREIGN PATENT DOCUMENTS

WO WO0175837 A2 10/2001

* cited by examiner

*Primary Examiner* — Marcus Hammonds

(57) ABSTRACT

The remote control for mobile applications is a remote control system adapted for use with PDAs. Specifically, the remote control for mobile applications establishes a Bluetooth connection between a remote control device and a controller application that is adapted to run on a PDA. The remote control for mobile applications is used to remotely control the operation of a target application that resides as a separate application on the PDA. The controller application receives commands from the remote control devices and causes the received command to be executed by the targeted application. The remote control for mobile applications comprises a remote control device, a controller application, and a Bluetooth connection.

8 Claims, 5 Drawing Sheets

REMOTE CONTROL FOR MOBILE APPLICATIONS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of application software for computers and other devices, more specifically, a software extension configured for use in remotely controlling software applications.

SUMMARY OF INVENTION

The remote control for mobile applications is a remote control system adapted for use with PDAs. Specifically, the remote control for mobile applications establishes a Bluetooth connection between a remote control device and a controller application that is adapted to run on a PDA. The remote control for mobile applications is used to remotely control the operation of a target application that resides as a separate application on the PDA. The controller application receives commands from the remote control devices and causes the received command to be executed by the targeted application.

These together with additional objects, features and advantages of the remote control for mobile applications will be readily apparent to those of ordinary skill in the art upon reading the following detailed description of the presently preferred, but nonetheless illustrative, embodiments when taken in conjunction with the accompanying drawings.

In this respect, before explaining the current embodiments of the remote control for mobile applications in detail, it is to be understood that the remote control for mobile applications is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the remote control for mobile applications.

It is therefore important that the claims be regarded as including such equivalent construction insofar as they do not depart from the spirit and scope of the remote control for mobile applications. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
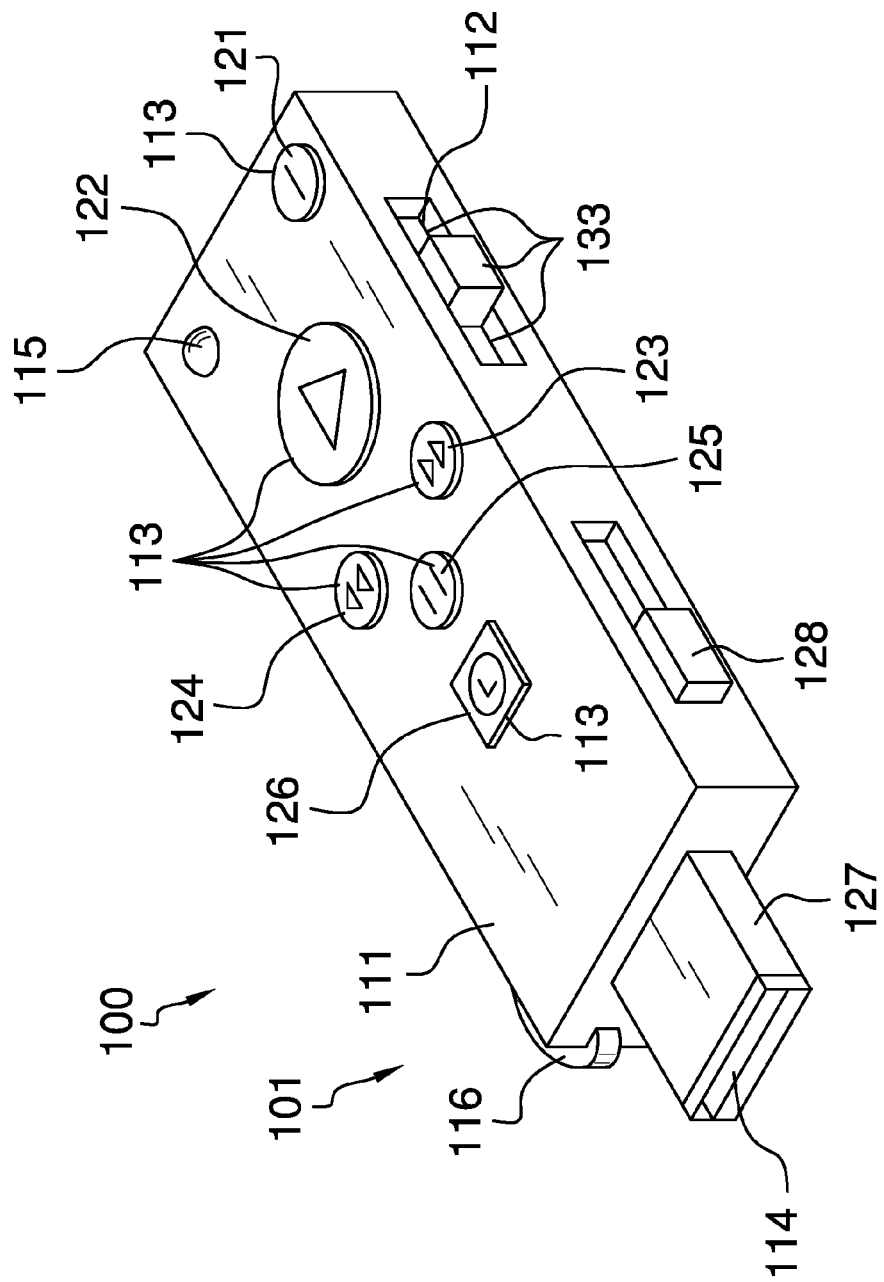
FIG. 1 is a perspective view of an embodiment of the disclosure.
Figure 2:
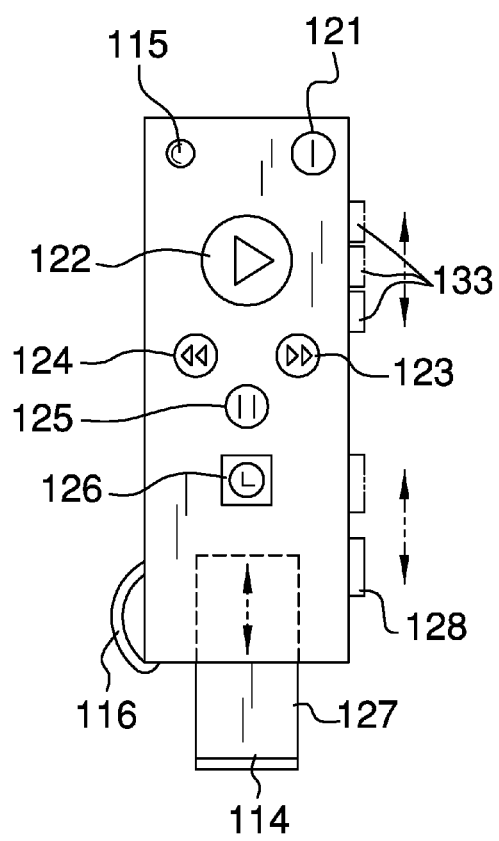
FIG. 2 is a front view of an embodiment of the disclosure.
Figure 3:
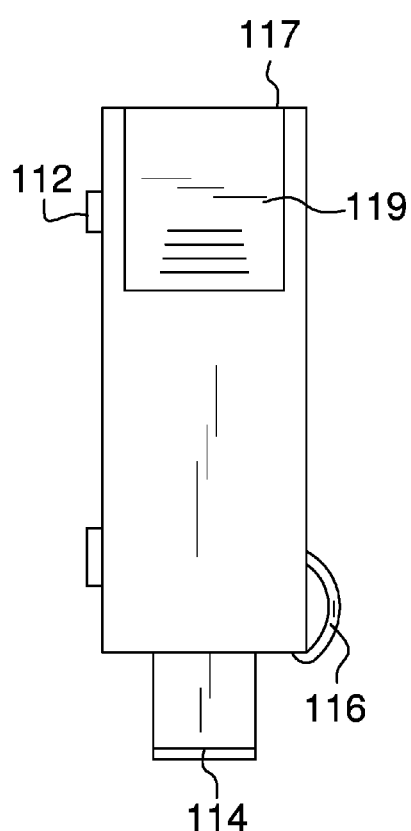
FIG. 3 is a rear view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6.

The remote control for mobile applications 100 (hereinafter invention) comprises a remote control device 101, a controller application 102, and a Bluetooth connection 103. The invention 100 is intended to interact with a PDA 141 that is used to run the controller application 102. The controller application 102 acts as an interface between the remote control device 101 and a selected target application 142 that is stored on the PDA 141. This interface permits the remote control device 101 to be used to control the operation of the target application 142.

The remote control device 101 further comprises a housing 111, a mode selection switch 112, a plurality of buttons 113, a USB Connection 114, an indicator LED 115, a loop 116, a battery compartment 117, and a Bluetooth module 118.

The housing 111 is a casing that contains the mode selection switch 112, the plurality of buttons 113, the USB Connection 114, the indicator LED 115, the loop 116, the battery compartment 117, and the Bluetooth module 118. As shown most clearly in FIGS. 1 through 3, the Bluetooth module 118 is completely contained within the housing 111. The battery compartment 117 is contained within the housing 111 but is accessible through a battery compartment door 119. The mode selection switch 112, the plurality of buttons 113, and the indicator LED 115 are mounted within and on the housing 111 such that they are visible and accessible during use. The loop 116 is externally mounted on the housing 111. The USB Connection 114 is used to directly connect the remote control device 101 to the PDA 141. The USB Connection 114 further comprises a USB plug 127 and a slide 128 for the USB plug 127. The slide 128 for the USB plug 127 is used to withdraw the USB plug 127 into the interior of the housing 111 and to extend the USB plug 127 beyond the housing 111 when required for operation. The operation of the USB Connection 114 is discussed elsewhere in this disclosure.

The purpose of the Bluetooth module 118 provides a communication link, called a Bluetooth connection 1036, between the remote control device 101 and the Bluetooth communication capabilities of the PDA 141. The interaction between the remote control device 101 and the PDA 141 is discussed elsewhere in this disclosure. The establishment of Bluetooth communications between electronic devices is well known and documented in the electrical arts.

The mode selection switch 112 is a single pole triple throw switch that is used to select between three target applications 142 controlled by the remote control device 101. The operation of the mode selection switch 112 is discussed elsewhere in this disclosure. The indicator LED 115 is an LED that is used to provide visual information regarding the operation of the remote control device 101. Specifically, when the indicator LED 115 is dark, the remote control device 101 is turned off. When the indicator LED 115 is continuously illuminated, the remote control device 101 is powered on but not transmitting. When the indicator LED 115 is flashing, the remote control device 101 is powered on and is transmitting instructions via the Bluetooth module 118 to the PDA 141. The plurality of buttons 113 further comprises a first button 121, a second button 122, a third button 123, a fourth button 124, a fifth button 125, and a sixth button 126. In the first potential embodiment of the disclosure the first button 121 is used to power the remote control device 101 on and off. The second button 122 is used to send a play command to the PDA 141 via the Bluetooth module 118. The third button 123 is used to send a forward command to the PDA 141 via the Bluetooth module 118. The fourth button 124 is used to send a back command to the PDA 141 via the Bluetooth module 118. The fifth button 125 is used to send a pause command to the PDA 141 via the Bluetooth module 118. The sixth button 126 is used to send a locate command to the PDA 141 via the Bluetooth module 118. While the names of these commands attempt to be descriptive, the actual function of the command will vary based on the target application 142 being remotely controlled by the remote control device 101. The interaction of theses commands with the controller application 102 is discussed elsewhere in this disclosure.

The battery compartment 117 stores the batteries which are used to power the remote control device 101. The loop 116 is a closed opening formed on the exterior of the housing 111 in order to allow a retaining device, such as a strap, to be attached to the loop 116 to prevent the accidental loss of the remote control device 101.

The controller application 102 is a set of logical instructions that are executed on the PDA 141 as an application. Specifically, the controller application 102 is an interface application that is used to enable one or more target applications 142 to be operated by the remote control device 101. A target application 142 is an application that exists independently on the PDA 141. The controller application 102 is specifically designed to work with each target application 142 as follows: the controller application 102 is designed to interface with the target application 142 in a manner that allows it to take a command received from the remote control device 101 and use the command received from the remote control device 101 to send a preprogrammed operating instruction to the targeted application 142. The commands received from the remote control device 101 are generated by the second button 122, third button 123, fourth button 124, and fifth button 125 located on the remote control device 101. The specific operating action indicated by the second button 122, third button 123, fourth button 124, and fifth button 125 will vary based on the targeted application 142 and the programmed interaction between the targeted application 142 and the controller application 102.

In all instances, the first button 121 is used to power on and power off the remote control device 101. The sixth button 126 issues a locate command to the controller application 102 that is independent of the selected targeted application 142. Specifically, the locate command instructs the controller application 102 to generate an audible sound that allows the PDA 141 to be found should it be misplaced.

Figure 6:
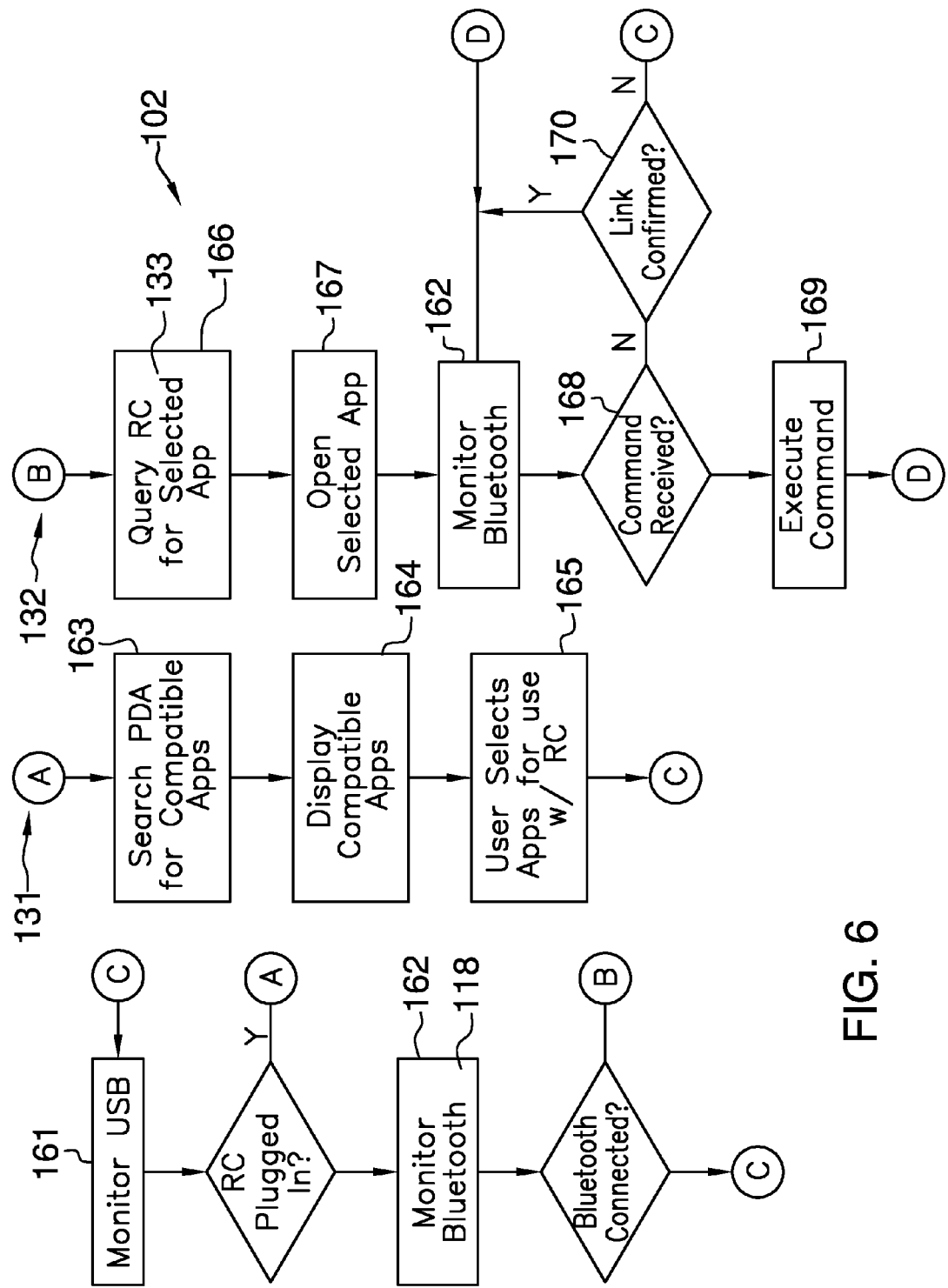
FIG. 6 is a flowchart of an embodiment of the disclosure.

As shown in FIG. 6, the controller application 102 operates as described in this paragraph and the next two paragraphs. The controller application 102 is designed to be in background operation in the PDA 141. While in background operation, the controller application 102 monitors 161 the USB port 143 of the PDA 141 and the controller application 102 also monitors 162 for the Bluetooth connection 103 between the PDA 141 and the remote control device 101. If the controller application 102 detects that the remote control device 101 is plugged into the USB port 143 of the PDA 141 the controller application 102 goes into what is referred to a program mode 131. If the controller application 102 detects an active Bluetooth connection 103 between the PDA 141 and the remote control device 101 the controller application 102 goes into what is referred to as an operation mode 132.

Figure 4:
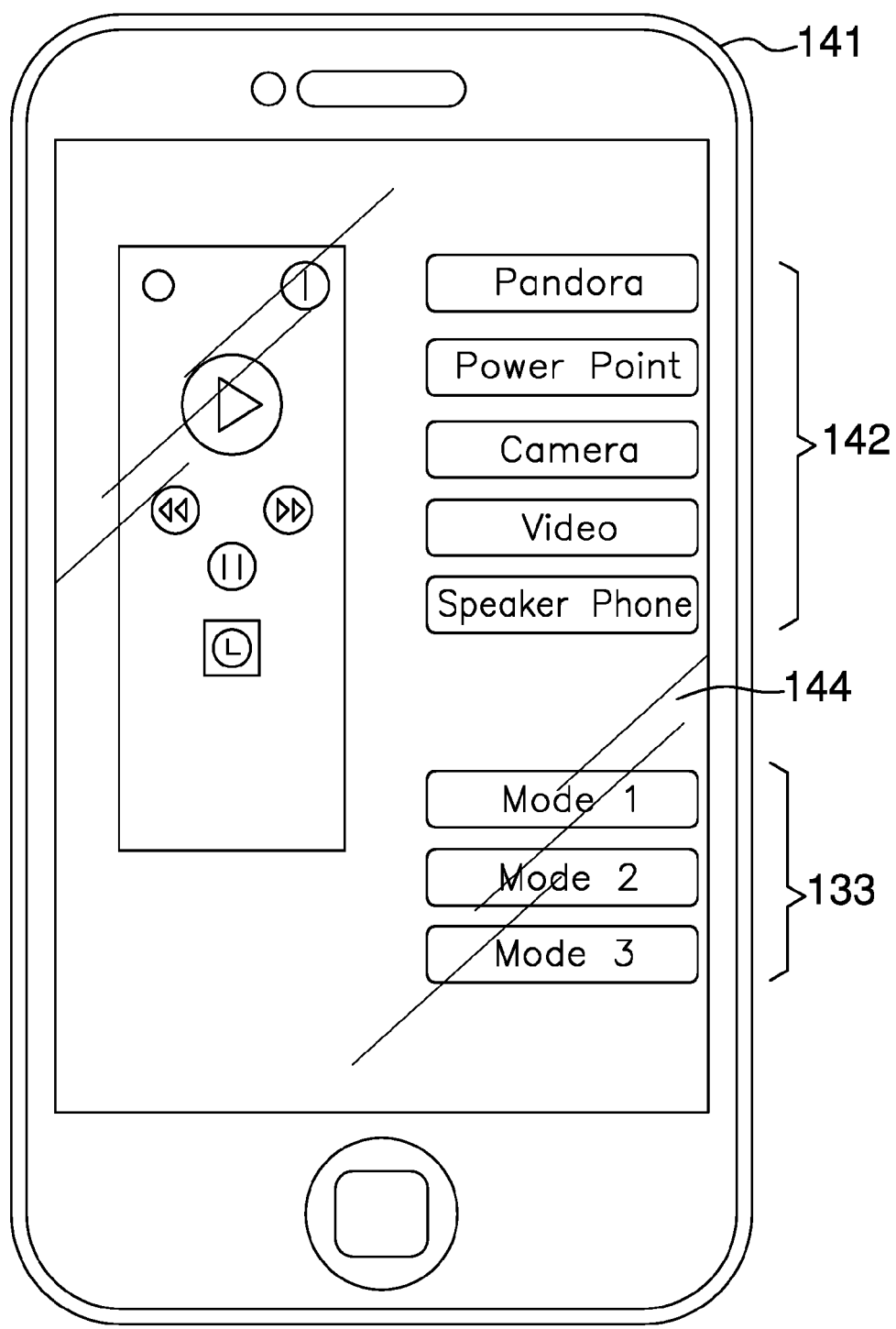
FIG. 4 is an in use view of an embodiment of the disclosure.
Figure 5:
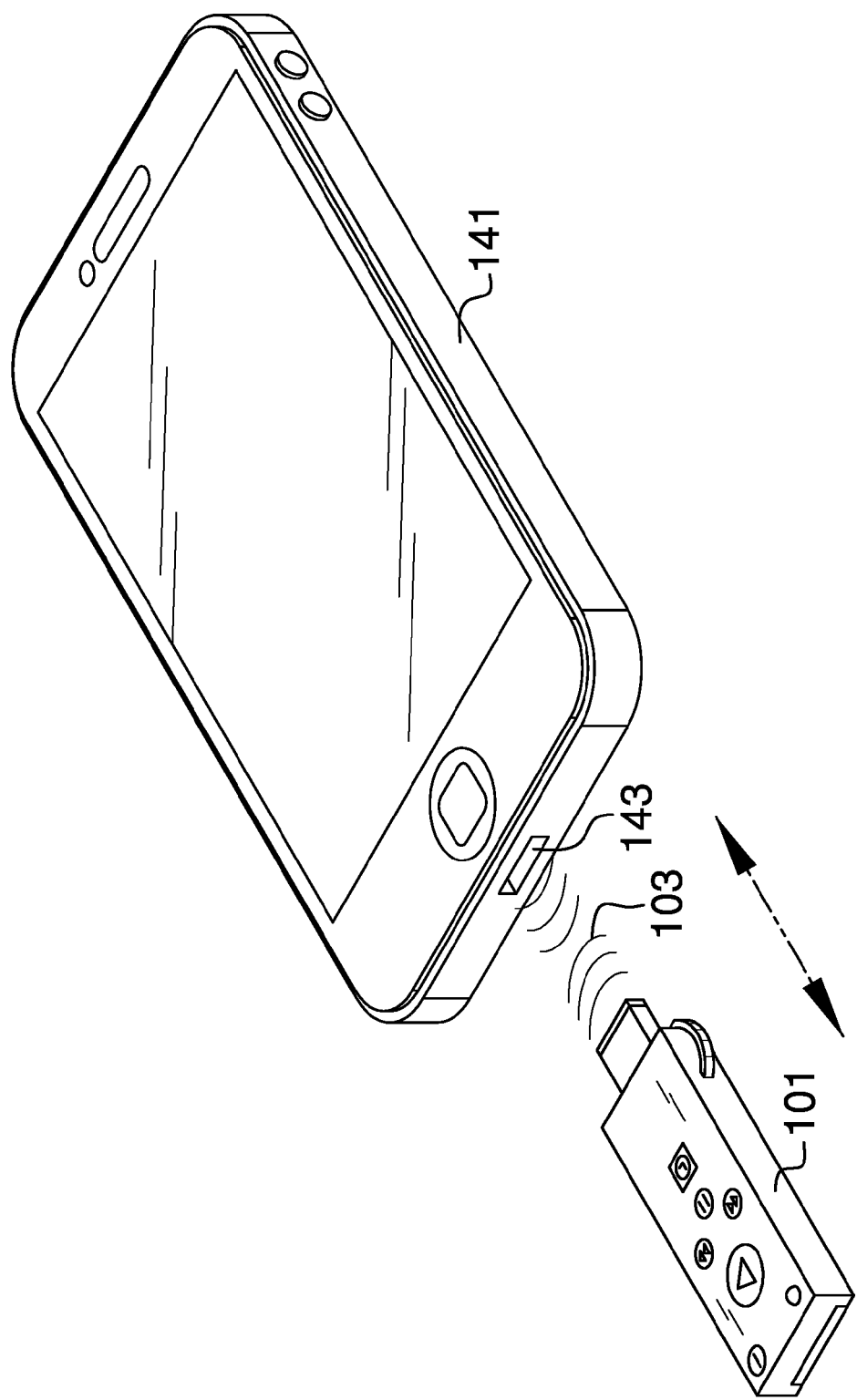
FIG. 5 is an in use view of an embodiment of the disclosure.

The program mode 131 assigns targeted applications 142 to each throw position of the mode selection switch 112. As shown in FIG. 6, when the controller application 102 initiates the program mode 131, the controller application 102 searches 163 all applications loaded on the PDA 141 and identifies the applications that the controller application 102 is specifically designed to interface with 164. As shown in FIG. 4, these potential target applications 164 are listed on the display 144 of the PDA 141. The controller application 102 also displays the mode selection location 133 buttons and allows for the assignment 165 of a specific target application 142 to a specific mode selection location 133. Once the target applications 142 are assigned, the controller application 102 exits the program mode 131 and returns to monitoring 161 the USB port 143 and the Bluetooth connection 103 between the PDA 141 and the remote control device 101.

The operation mode 132 receives a command from the remote control device 101 and uses the command received to execute a set of preprogrammed instructions within the targeted application 142. Once the operation mode 132 is initiated by the controller application 102, the controller application 102 queries 166 the remote control device 101 to determine the position of the mode selection switch 112 which the controller application 102 uses to determine the specific targeted application 142 to be interfaced with. If the selected targeted application 142 is not open, the controller application 102 open 167 the selected targeted application 142. The controller application 102 then monitors 162 the Bluetooth connection 103 to receive a command 168 and to confirm that the Bluetooth connection 103 remains established 170. If the controller application 102 receives a command 168 the controller application 102 executes 169 the command received and returns to monitoring 162 the Bluetooth connection 103 from within the operation mode 132. If the controller application 102 determines that the Bluetooth connection 103 is no longer established 170, the controller application 102 exits the operation mode 132 and returns to monitoring 161 the USB port 143 and monitoring 162 the Bluetooth connection 103 between the PDA 141 and the remote control device 101.

The use the invention 100, the mode selection switch 112 is set to the target application 142 and the remote control device 101 is turned on using the first button 121. Once the link is established between the remote control device 101 and the PDA 141, the second button 122, third button 123, fourth button 124 and fifth button 125 are used to send remote commands to operate the target application 142. When finished, the first button 121 is pressed to turn off the remote control device 101.

In the first potential embodiment of the disclosure, the controller application 102 is configured to run on Android based operating systems.

In the second potential embodiment of the disclosure, the controller application 102 is configured to run on Microsoft based operating systems.

The invention 100 can be programmed to support any application that runs on a supported operating system. Ideal candidates for target applications 142 include, but are not limited to: 1) the operation of camera and video recording applications; 2) the operation of entertainment applications such as music player applications and video player applications; and, 3) the operation of presentation applications.

The following definitions were used in this disclosure:
Battery: As used in this disclosure, a battery is a container consisting of one or more cells, in which chemical energy is converted into electricity and used as a source of power.

Housing: As used in this disclosure, a housing is a rigid casing that encloses and protects one or more devices.

PDA: As used in this disclosure, a PDA is a handheld device that is used for managing personal information and communication. Examples of PDAs include, but are not limited to, cellular phones, tablets and smart phones.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A device comprising:
a remote control device,
a controller application, and
a Bluetooth module;
wherein the device is adapted to work with a PDA (portable digital assistant);
wherein the device interacts with the PDA to remotely control one or more target application on the PDA;
wherein the controller application provides the logic for an interface between the remote control device and the one or more target applications;
the device and the PDA share Bluetooth connection via the Bluetooth module;
wherein the remote control device further comprises a mode selection switch used to select between three target applications controlled by the remote control device and the mode selection switch is a single pole triple throw switch;
wherein the remote control device further comprises a plurality of buttons and a first button of the plurality of buttons is used to locate the PDA; and
wherein the remote control device further comprises a USB (universal serial bus) connection including a USB plug and a slide to slidably withdraw the USB plug into the interior of the remote control device and slidably extend the USB plug to the exterior of the remote control device.

2. The device according to claim 1 wherein the plurality of buttons further comprises a second button, a third button, a fourth button, and a fifth button;
wherein the second button, the third button, the fourth button, and the fifth button generate commands transmitted by the remote control device to the PDA.

3. The device according to claim 1 wherein the controller application is a set of logical instructions that are executed on the PDA as an application;
wherein the controller application is an interface application that is used to enable the one or more target applications to be operated by the remote control device;
wherein the controller application interfaces with the one or more target applications in a manner that allows it to take a command received from the remote control device and use the command received from the remote control device to send preprogrammed operating instruction to the one or more targeted applications.

4. The device according to claim 3 wherein the controller application further comprises a background operation;
wherein the background operation monitors the USB connection of the PDA and the Bluetooth connection between the PDA and the remote control.

5. The device according to claim 4 wherein the controller application further comprises a program mode;
wherein the program mode assigns a specific target application of the one or more target applications to each throw position of the mode selection switch.

6. The device according to claim 5 wherein the controller application further comprises an operating mode;
wherein the operating mode queries the remote control device to determine the throw position of the mode selection switch;
wherein the operation mode uses the throw position of the mode selection switch to determine a selected target application;
wherein when the selected target application is not open the operation mode opens the selected target application;
wherein the operation mode monitors the Bluetooth connection for the command from the remote control;

wherein the operation mode monitors the Bluetooth connection to confirm that the Bluetooth connection remains established;

wherein the operation mode executes the command received from the remote control device according to the preprogrammed operating instruction.

7. The device according to claim 6 wherein the plurality of buttons further comprises a sixth button that is used to power the remote control on and off.

8. The device according to claim 7 wherein the plurality of buttons further comprises a second button, a third button, a fourth button, and a fifth button;

wherein the second button, the third button, the fourth button; and the fifth button generate commands transmitted by the remote control device to the PDA.

* * * * *